No. 614,673. Patented Nov. 22, 1898.
A. TAYLOR.
POST VISUAL REFLECTOR.
(Application filed June 1, 1897.)
(No Model.)
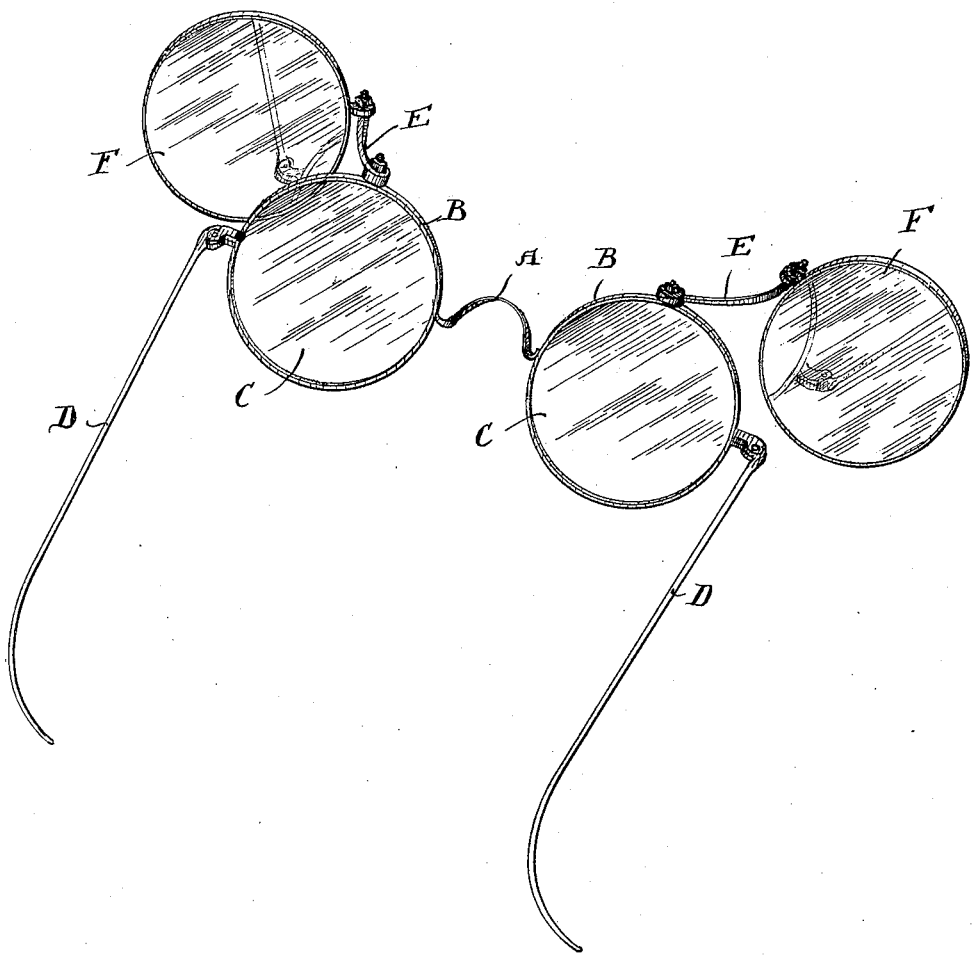

United States Patent Office.

ALLAN TAYLOR, OF BOSTON, MASSACHUSETTS, ASSIGNOR OF TWO-THIRDS TO DE FOREST W. CHASE, OF SAME PLACE, AND MILTON CHASE, OF HAVERHILL, MASSACHUSETTS.

POST-VISUAL REFLECTOR.

SPECIFICATION forming part of Letters Patent No. 614,673, dated November 22, 1898.

Application filed June 1, 1897. Serial No. 638,845. (No model.)

*To all whom it may concern:*

Be it known that I, ALLAN TAYLOR, a citizen of the United States, and a resident of Boston, in the county of Suffolk and State of Massachusetts, have invented certain new and useful Improvements in Post-Visual Reflectors, of which the following, taken in connection with the accompanying drawing, is a specification.

The object of my invention is to produce what I may term a "post-visual reflector," which may be defined as a device for extending the range of vision to post-visual objects or objects outside of and behind the normal visual range.

The invention consists of a pair of adjustable reflectors attached or connected to a pair of spectacles or mud-guards in such manner that the relation between the eyes and the reflectors will remain unchanged, whereby objects in the rear will be reflected, thus enabling the wearer to see what is behind while he is looking in a forward direction; and the invention is particularly adapted for races—such as horse, bicycle, and boat—and also for ordinary roadwork.

Referring to the accompanying drawing, the figure represents a pair of spectacles having adjustable reflectors attached thereto and embodying my invention.

A represents the bridge, B the bows, C the glass, and D the sides or temples, all of which may be of ordinary construction.

To the upper central portion of each of the bows B is pivoted an arm E, to the outer end of which is pivoted the frame of an adjustable reflector F, so that the latter can be set in any desired position in relation to the glass C, which may be of ordinary plain glass, to act as a mud-guard or a lens adapted to the sight of the wearer.

By means of spectacles having adjustable reflectors attached to them in the manner described the relation between the eye and the reflectors remain unchanged in whatever the position of the head of the wearer may be, for as his head is moved so are the reflectors. Thus objects in the rear are reflected so as to be seen by the eye when the wearer is looking forward. This is particularly advantageous in all kinds of races, for often the foremost man loses the race by simply turning his head to see the position of his competitors, and especially when racing with a horse having a sensitive mouth, for the driver cannot change the position of his body in the slightest degree without causing some effect upon the mouth of the horse whereby his gait may be affected.

By means of these adjustable reflectors accidents that often happen may be avoided, the position of things behind being visible to the rider, so that should there be a chance of something running into his vehicle he can easily govern his vehicle accordingly and get out of the way.

The arms E being pivotally attached to the upper central portion of the bows B and extending outwardly and the outer ends of said arms being pivotally attached to the upper ends of the frames of the reflectors F, said reflectors can be arranged in any desired position in relation to the glasses of the spectacles or mud-guards to accord with the vision of the wearer and when not in use to be folded so that the reflectors will fit over the glasses to allow same to be put into a case or pocket.

It will be observed that the reflectors by reason of their peculiar mounting may be adjusted toward or from the eye without changing their angular direction with respect to the support or to the range of vision. In other words, the reflector may be adjusted toward or from the eye and at all times remain in a plane parallel to the eye glass or guard or other support, and, if desired, both reflectors may be retained at all times in alinement, which would not be possible if they were hinged to a part of the spectacle or guard frame, and post-visual objects may be observed without having the reflectors located in a position to obstruct the view through the lenses.

What I claim is—

1. In a post-visual-reflecting device, the combination with a support adapted to be carried by the head, of a reflector adjustable toward or from said support without changing its angular relation with respect thereto, substantially as specified.

2. In a post-visual-reflecting device, the combination with a support adapted to be carried by the head, of a plurality of reflectors, and means for accomplishing their adjustment without changing their angular relations, substantially as specified.

3. In a post-visual-reflecting device, the combination with a spectacle or similar frame designed to be carried by the head, of an arm pivoted at one extremity to the upper portion of one of the bows of said frame, and a reflector pivoted adjacent to its top to the opposite extremity of said arm whereby the reflector may be adjusted toward or from the frame without changing its angular relation with respect thereto, and may be brought substantially into coincidence with the bow to facilitate the storing of the device as for instance in the pocket, substantially as specified.

In testimony whereof I have signed my name to this specification, in the presence of two subscribing witnesses, on this 14th day of May, A. D. 1897.

ALLAN TAYLOR.

Witnesses:
  NEWELL D. ATWOOD,
  EDWIN PLANTA.